United States Patent [19]
Ehlert

[11] Patent Number: 4,637,493
[45] Date of Patent: Jan. 20, 1987

[54] MIST GENERATORS

[75] Inventor: Charles W. Ehlert, Katy, Tex.

[73] Assignee: Lubricating Systems Company of Texas, Inc., Houston, Tex.

[21] Appl. No.: 255,238

[22] Filed: Apr. 17, 1981

[51] Int. Cl.⁴ .................... F01M 1/08; F01M 5/00
[52] U.S. Cl. .................... 184/55.1; 184/6.26
[58] Field of Search ............ 184/1 R, 6.22, 6.26, 184/55 R, 55 A, 56 R, 104 R, 104 A; 165/104.11, 164; 239/135, 139; 219/362, 276; 261/142, 157, 159

[56] References Cited

U.S. PATENT DOCUMENTS

| | | | |
|---|---|---|---|
| 2,122,585 | 7/1938 | Pollack et al. | 184/104 R X |
| 2,625,211 | 1/1953 | Hill | 431/41 |
| 2,753,013 | 7/1956 | Tear | 184/55 A |
| 2,839,332 | 6/1958 | Sackett | 184/104 A |
| 2,916,030 | 12/1959 | Hoeth | 184/104 A X |
| 3,191,718 | 6/1965 | Haywood | 184/55 R X |
| 3,491,855 | 1/1970 | Obergefell et al. | 184/55 R |
| 3,605,942 | 9/1971 | Lyth | 184/55 A X |
| 3,606,936 | 9/1971 | Obergefell et al. | 184/55 A X |
| 3,677,529 | 7/1972 | Johnson | 123/559 X |
| 4,335,804 | 6/1982 | Bardin et al. | 184/55 A |

Primary Examiner—Deborah L. Kyle
Assistant Examiner—John E. Griffiths

[57] ABSTRACT

An oil mist generator for generating an oil mist for lubrication purposes wherein the oil reservoir is heated by passing a heated air conduit through the body of oil to heat the oil and therefore mixing heated oil and heated air in a mist generator.

6 Claims, 2 Drawing Figures

MIST GENERATORS

BACKGROUND OF THE INVENTION

This invention relates to oil mist lubricating systems and more particularly, to new and improved apparatus and systems for creating oil mist for use in mist lubricating systems.

Oil mist lubricating systems are well known systems for providing lubrication to a wide variety of bearing and surfaces which include anti-friction bearings, gears, slides, chains, slides and ways, and so forth. Typical applications include machine tools, spindles and gear cases and all high speed machine components.

In an oil mist lubricating system, an oil mist or aerosol is generated at a central location and carried through pipes to a point of use such as a bearing. In the operation of a mist lubricating system, it is typically a requirement to heat the air and to heat the oil supplied to the mist generator independently of one another before they are combined to create the mist form. This process, of course, requires separate sets of heating equipment and controls. The use of independent controls is both expensive and can lead to some iregularities in the generation of a mist.

In the present invention, it has been discovered that the separate functions of heating the air and oil can be combined and integrated into one system so that the relationship between the heating of the air and the oil is interdependent and inter-related.

DESCRIPTION OF THE PRIOR ART

U.S. Pat. No. 2,625,211 issued to Hill relates to an air and fuel preheater in which the oil is heated in a chamber 30 while air is heated by contact with the chamber 30.

The U.S. Pat. No. 3,491,855 issued to Obergefell relates to an oil mist lubricating system in which there is a separate air heater 14 independent of the oil heater 22.

The U.S. Pat. No. 3,606,936 issued to Obergefell relates to an oil mist lubricating system in which a one piece metal body is utilized with the oil heater being independent from the air supply.

The U.S. Pat. No. 2,753,013 issued to Lear relates to an oil mist generator in which the air supply and heater are independent of one another.

The U.S. Pat. No. 1,942,956 issued to Gray relates to separate and independent air and oil heater devices.

The U.S. Pat. No. 3,677,529 issued to Johnson relates to a heater for raising the temperature of a fuel-air mixture.

SUMMARY OF THE INVENTION

The present invention may be summarized as comprising a method and apparatus for generating a mist by use of a single heating system for both the air and oil in which the air is heated while being passed through an oil reservoir thereby also to heat the oil by convection. The heated air is directed to the mist head to mix the heated oil and the heated air and to create an oil mist in the reservoir. In the present invention, only a single heating element and single set of heat regulating devices are required.

DESCRIPTION OF THE PREFERRED EMBODIMENT

Figure 1:
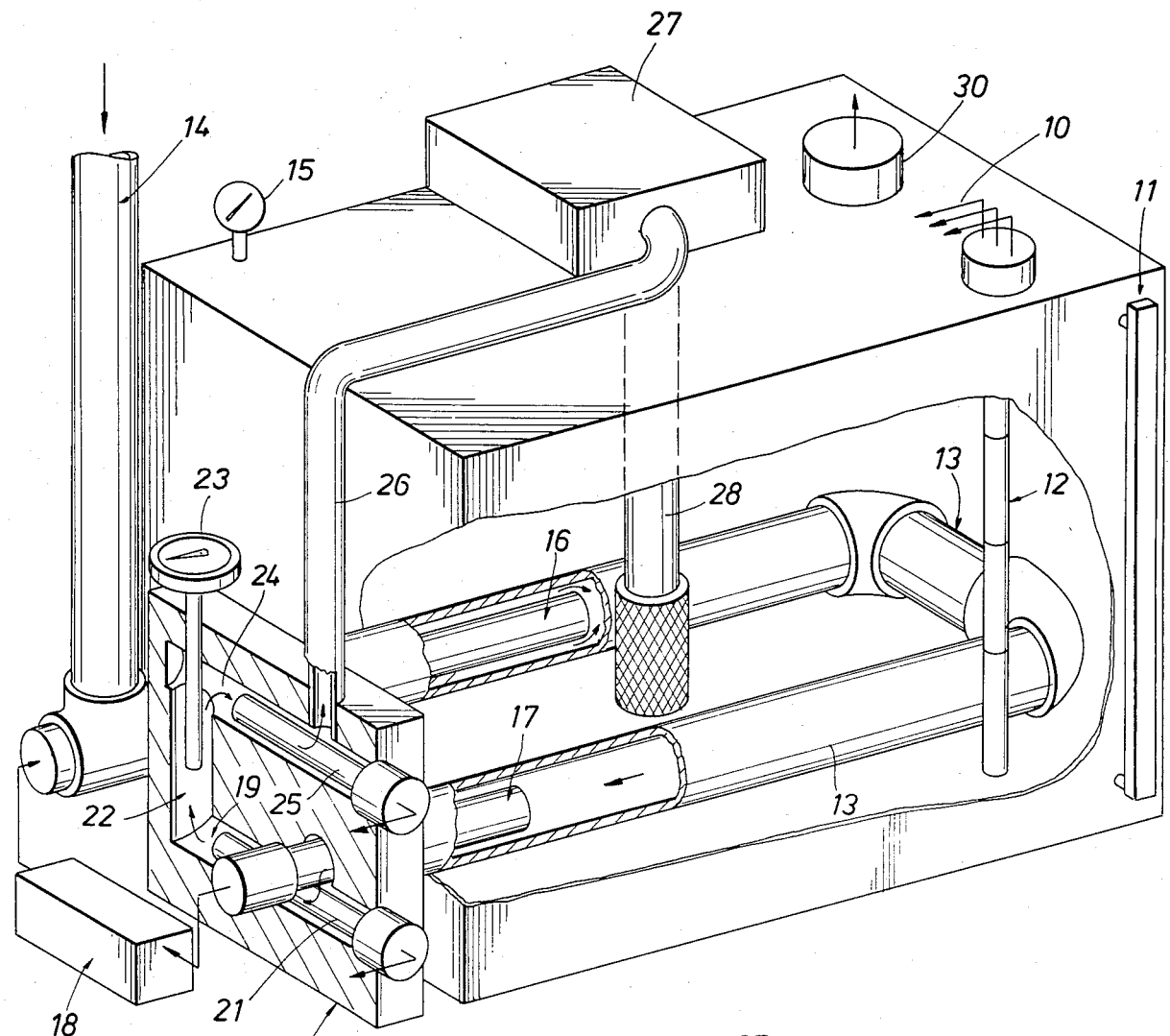
FIG. 1 is a perspective view of a oil mist generating system constructed in accordance with the present invention.

Referring now to FIG. 1, a mist generator for use in a centralized lubrication system is indicated generally by the reference numeral 10 and comprises an elongated rectangular shaped enclosure chamber or reservoir. The interior of the reservoir or chamber contains a level of liquid oil somewhat less than half the height of the reservoir. An exterior gauge 11 provides a sight indication of the level of oil in the reservoir 10. A set of conventional switches 12 provides for electrical signals of the oil level and control of an oil input (not shown) to replenish the liquid oil misted for use in the system.

An air flow conduit means couples air from an input pipe 14 to a mist generator 27 located at the top of the reservoir 10. The air flow conduit means includes a vertical input pipe, a horizontal U-shape pipe 13, flow passageways 19, 22 and 24 in a control block 20 and a pipe 26 which is connected to a mist generator 27.

The horizontal, U-shaped tubular conduit 13 is disposed in the lower quadrant of the reservoir 10 so as to be submerged under the level of liquid oil within the reservoir 10 and is connected to an external, vertical input pipe 14 to receive input air from under pressure from a source of air (not shown). It is customary to build up to a predetermined air pressure within the air flow conduit means. The reservoir pressure is indicated on an external sight gauge 15.

In a horizontal part of the tubular conduit 13 is an elongated electrical heating element 16 which is concentrically disposed within the conduit 13. The heating element 16 serves to heat both the air in the conduit 13 and, through radiation through the tubing to heat the oil within the reservoir 10. The outlet of the U-shaped conduit connects to a passageway in a control block 20. A control element 17 is concentrically disposed in the outlet end of the conduit 13 and the passageway in the control block. The control element 17 senses the ambient temperature of the air in the conduit 13 and provides a control signal to a conventional controller unit 18 which regulates the electrical power to the heating element 16 to control the temperature of the ambient air in the conduit 13. The passageway in the control block 20 connects to an external cross-over passageway 19 in the control block 20. In the passageway 19, is a low temperature sensing unit 21 which detects the air temperature and sounds an audible alarm when the temperature in the passageway drops below a predetermined value. A vertical passageway 22 in the control block 20 contains an external visual temperature indicator 23 and connects the passageway 19 with an upper horizontal passageway 24. In the passageway 24 is a high temperature sensing unit 25 which detects the ambient air temperature and sounds an audible alarm when the temperature in the passageway 24 exceeds a predetermined value. The passageway 24 from the control block 20 is connected to a vertical pipe 26 which is the air input to a mist generator 27 located on the roof of the reservoir 10. The vertical pipe 26 can be located within the reservoir or insulated to reduce heat loss.

The mist generator 27 has a depending fluid intake pipe 28 which extends downwardly into the fluid oil 29 within the reservoir 10. The reservoir 10 has an outlet 30 in the roof for conveying the oil mist to the bearing systems.

Figure 2:
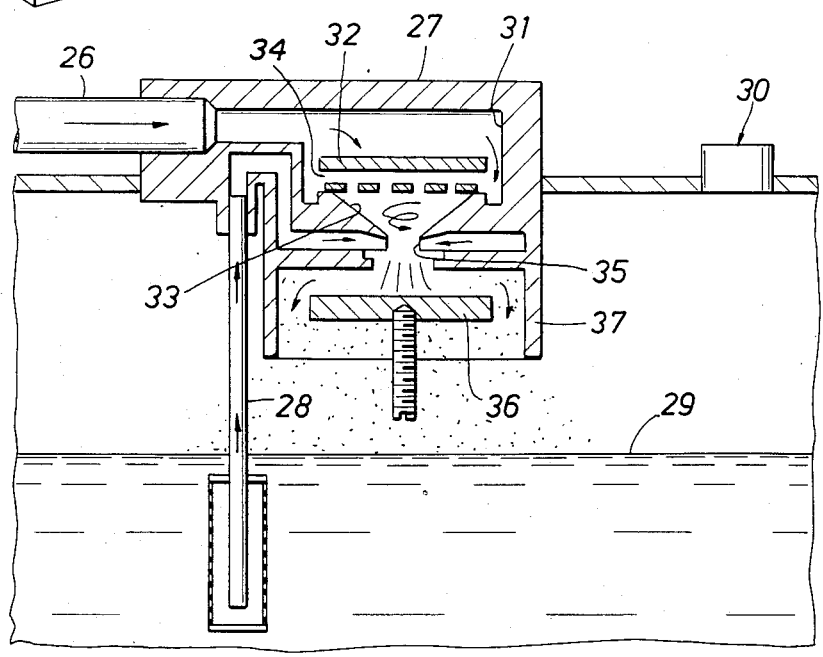
FIG. 2 is a view and vertical cross-section through a mist generating head.

As shown in FIG. 2, the mist generator 27 includes the air inlet pipe 26 which introduces heated air into a cylinder or chamber 31. The cylinder or chamber 31 below the air intake pipe 26 has a horizontal baffle plate 32 which is cylindrically shaped and defines an annular space with the cylinder 31 for passage of the heated air to a vortex chamber 33.

The heated air is guided from the baffle plate 32 by tangential slots 34 at the entry of the vortex chamber 33 to enter into the vortex chamber with a whirling motion. The heated air flows downward and out through an orifice 35 at sonic velocity. The liquid oil 29 in the reservoir is drawn up through the fluid intake pipe 28 by suction and passed through internal passages around the vortex chamber 33 to a point just below the orifice 35 where the heated oil is mixed with the heated air to form a mist of droplets. A cylindrical deflector disc 36 and annular baffle ring 37 define an annular opening which serves to eliminate oil particles too large to be transported through the outlet pipe 30. Thus, the larger droplets are returned to the fluid in the reservoir and only mist droplets of the proper size are conveyed to the lubricating system. In the present invention, a closed oil reservoir 10 having an outlet 30 is provided with a air conduit 13 disposed within the reservoir so as to be located below the level of liquid 29 in the reservoir. The air input and the air conduit 13 are heated by a controlable heating element 12 so that both the air and the oil in the reservoir are heated from the same heating source. The temperature in the air conduit 13 is monitored and a control means 17 controls the heating element 16 to maintain a pre-set temperature in the reservoir. High and low temperature alarm devices (21,25) are provided for temperature indication purposes. The heated air and the heated oil are combined in a mist generator head 27 to provide a mist for the system. From the foregoing system, it will be apparent that only one set of heating devices and controls are necessary.

I claim:

1. An oil mist lubricating system comprising:
   an enclosed air-oil admixing reservoir containing liquid oil and having a mist exit opening disposed above the normal surface level of liquid oil in said reservoir;
   mist generating means for admixing heated oil from said reservoir and heated air to provide an oil mist in said reservoir, said mist generating means being disposed in said reservoir above the normal surface of oil in said reservoir;
   supply tube means for supplying liquid oil within said chamber to said mist generating means;
   air flow conduit means which includes a conduit disposed in said chamber so as to be normally submerged in the oil when liquid oil is in said chamber, said conduit being constructed to transfer heat by convection to the liquid oil,
   said air flow conduit means having an input constructed and arranged for connection to a source of air under pressure,
   heater element means disposed within said air flow conduit of said conduit means for heating the air input to said conduit of said air flow conduit means and for simultaneously heating the liquid oil in said reservoir exterior of said conduit;
   said air flow conduit means having an output pipe connected to said mist generator means.

2. The apparatus as defined in claim 1 and further including:
   temperature sensing means disposed within said air flow conduit means for sensing temperature and providing an electrical signal functionally related to the sensed temperature;
   control means responsive to said electrical signal from said temperature sensing means for controlling said heater element means for regulating the temperature of the air in said air flow conduit means.

3. The apparatus as defined in claim 1 wherein there are sensing means disposed within said air flow conduit means for sensing high and low temperature limits.

4. The apparatus as defined in claim 1 wherein said air flow conduit means contains means for sensing and controlling the temperature of the air input.

5. A method of forming an air-oil mist for lubrication purposes comprising the steps of:
   supplying a flow of air under pressure to an oil/air mist generator; passing the flow of air through a conduit submerged in a body of oil;
   heating such flow of air in the conduit for supplying heated air to the air-oil mist generator and for simultaneously heating the body of oil from the heat of the air in the conduit,
   combining said heated oil from such body of oil and the heated air from said conduit in the mist generator for developing an oil mist.

6. The method as defined in claim 5 and further including the step of sensing the air temperature of the air in the conduit as it exits from the body of oil and adjusting the amount of heat supplied to the flow of air to maintain a regulated relationship of the temperature of the body of oil relative to the temperature of the air.

* * * * *